United States Patent [19]

Smith et al.

[11] 4,085,688

[45] Apr. 25, 1978

[54] TREATMENT OF EFFLUENT

[76] Inventors: Clive Richard Smith, 2 Bent Lea,, Bradley, Huddersfield, HD2 1QW; Brian Mills, 14 Victoria Road, Liversedge, West Yorkshire, both of England

[21] Appl. No.: 641,869

[22] Filed: Dec. 17, 1975

[51] Int. Cl.$^2$ .............................................. F23G 7/04
[52] U.S. Cl. ..................................... 110/238; 162/29; 162/189; 210/71; 423/224
[58] Field of Search ............... 423/224, 428, 232, 573, 423/233, 563, 514, 566, 427, 521, 519, 571, 366, 354, 355, 512, 551, 560, 236; 159/4 A, 47 WL; 162/29, 32, 36, 63, 64, 86, 189; 210/71; 110/7 R, 7 B, 7 S; 122/7 R, 7 C

[56] References Cited

U.S. PATENT DOCUMENTS

| 2,056,266 | 10/1936 | Goodell | 122/7 |
| 2,064,953 | 12/1936 | Serpas | 110/7 |
| 2,303,811 | 12/1942 | Badenhausen | 110/7 |
| 2,747,552 | 5/1956 | Kyrklund | 110/7 |
| 3,561,922 | 2/1971 | Allen et al. | 122/7 |

Primary Examiner—Kenneth W. Sprague
Attorney, Agent, or Firm—Jim Zegeer

[57] ABSTRACT

Contaminated aqueous alkali wash liquor from the treatment of gases containing hydrogen sulphide and/or hydrogen cyanide is reconstituted by treatment at an elevated temperature in a reducing atmosphere followed by quenching to form reconstituted wash liquor. The contaminated liquor is concentrated, before entering the reducing atmosphere, by direct contact with hot gases derived from the hot reducing atmosphere. Quenching and concentration are carried out by interaction of a gaseous medium with a liquid spray. Generation of the hot reducing atmosphere, reaction of the contaminated liquor with the hot reducing atmosphere, and concentration of the contaminated liquor may be carried out in a single chamber.

4 Claims, 4 Drawing Figures

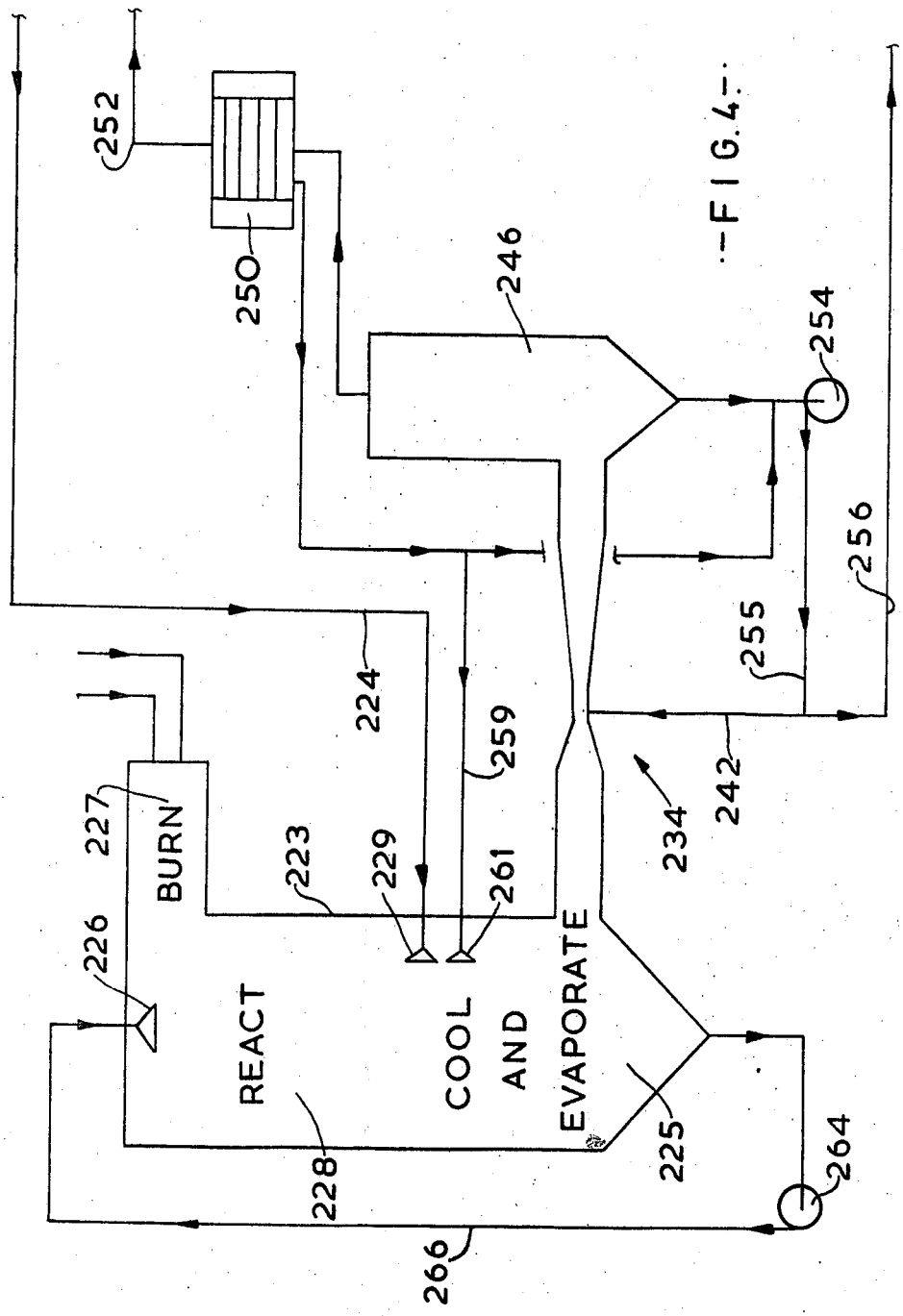

TREATMENT OF EFFLUENT

The present invention relates to effluent treatment and more particularly to the treatment of aqueous alkali effluent containing sulphur compounds.

In one known process for the removal of hydrogen sulphide from fuel gas such as manufactured coal gas, the gas is washed in an aqueous alkali wash liquor and the resulting hydrosulphide is oxidised to elemental sulphur which is removed from the wash liquor by froth flotation. The hydrosulphide is oxidised to sulphur by means of a salt of a metal in a high oxidation state, a typical metal being pentavalent vanadium which during oxidation of the hydrosulphide is itself reduced to quadrivalent vanadium. The reduced vanadium is reoxidised to pentavalent vanadium by aerial oxygen in the presence of anthraquinone disulphonate. The net result is the oxidation of hydrogen sulphide to elemental sulphur by aerial oxygen.

Whilst this process is extremely efficient and is widely used, there are undesirable side reactions which cause contamination of the alkali wash liquor so that the wash liquor must be discarded and replaced. The major undesirable by-product is thiosulphate which arises from direct aerial oxidation of hydrosulphide in solution or of elemental sulphur in suspension in the wash liquor. Certain of the thiosulphate may be further oxidised to sulphate by the anthraquinone in the wash liquor. Thiosulphate and sulphate are undesirable in that their formation involves the fixation of alkali and sulphur so that wash liquor is consumed and sulphur is lost. Furthermore, very high thiosulphate concentrations may cause the precipitation from solution of expensive vanadium salts.

Thiosulphate concentration is controlled by continuously bleeding off contaminated wash liquor and making up with fresh liquor. Disposal of the contaminated effluent wash liquor is generally by dumping after evaporation.

The problem of wash liquor contamination is very much accentuated by the presence of cyanide in the fuel gas under treatment. Hydrogen cyanide is absorbed with extremely high efficiency by the alkali wash liquor and forms thiocyanate by reaction with elemental sulphur in suspension. Formation of thiocyanate, like the formation of thiosulphate, is undesirable in that it involves the fixation of alkali and sulphur, and presents an even more serious disposal problem as thiocyanate is biologically offensive and cannot be dumped without prior treatment such as oxidative combustion or very considerable dilution.

In a development of the above process, gases containing hydrogen sulphide are pretreated by washing with an aqueous alkali solution of polysulphide. The polysulphide reacts with the cyanide to form thiocyanate which dissolves in the wash liquor. Whilst this avoids contamination by cyanide of the wash liquor used in the hydrogen sulphide washing plant, the formation of thiocyanate in the wash liquor in the hydrogen cyanide washing plant again involves the fixation of alkali and sulphur and presents the same problem of contaminated liquor disposal.

The present invention seeks to provide a process for treating alkali effluent liquors containing sulphur compounds so as to recover alkali and sulphur.

According to the present invention, there is provided a process for treating effluent aqueous alkali liquors containing sulphur compounds, comprising thermally reconstituting the liquor in a combustion chamber under a reducing atmosphere to produce a gaseous combustion product having finely divided particulate matter entrained therein, and conducting said combustion product from the chamber through a scrubber wherein said combustion product is quenched and said particulate matter passes into aqueous solution.

According to a second aspect of the present invention, in a process for washing hydrogen sulphide and hydrogen cyanide from a gaseous medium, in which the hydrogen sulphide is oxidised in an aqueous alkali liquor to elemental sulphur and the hydrogen cyanide is removed by polysulphide in an aqueous alkali liquor, liquor contaminated by hydrogen cyanide removal is thermally reconstituted in a combustion chamber under a reducing atmosphere to produce a gaseous combustion product having finely divided particulate matter entrained therein, said combustion product then being conducted from the combustion chamber through a scrubber wherein said combustion product is quenched and said particulate matter passes into aqueous solution.

Preferably, the scrubber operates by introducing reconstituted aqueous liquor into a stream of combustion product flowing through the scrubber. In a preferred embodiment the scrubber is provided with a spray device through which quench liquor is introduced into the stream of combustion product, the stream of combustion product preferably being accelerated upon introduction of the quench liquor and the resulting aqueous solution passing from the scrubber in droplet form.

Advantageously, the scrubber is a venturi scrubber having a reduced throat and a liquor spray in or upstream of the throat.

According to an advantageous feature of the present invention, the liquor is concentrated by evaporation before thermal reconstitution in the combustion chamber. The arrangement is preferably such that a proportion of the water in the liquor is separated from the liquor by evaporation and by-passes the combustion chamber, only the concentrated liquor being reconstituted in the combustion chamber. The two fractions are then combined in a later stage in the system, after reconstitution.

The evaporator is preferably a direct contact evaporator in which the liquor is heated and concentrated by hot products of combustion from the combustion chamber. Conveniently, the evaporator and combustion chamber are combined into one vessel.

According to a further advantageous feature of the present invention, said reducing atmosphere is generated at an elevated temperature in the absence of the liquor to be reconstituted and said liquor is thereupon introduced into the hot reducing atmosphere whereupon said liquor is thermally reconstituted.

Generation of the hot reducing atmosphere and thermal reconstitution of said liquor preferably take place in respective separate zones of a chamber. Whilst this chamber is referred to above as a combustion chamber, combustion, which is generally understood to be an oxidative process, takes place only in the first zone in which, for example, fuel gas such as coke oven gas is combusted in an amount of air which results in incomplete combustion of the fuel gas and thereby gives rise to a hot reducing atmosphere. The thermal reconstitution of the liquor is a reductive rather than an oxidative process.

When the liquor is to be concentrated by evaporation in the chamber in which the thermal reconstitution occurs, the chamber will have three more or less distinct zones, namely an upstream combustion zone in which the hot reducing atmosphere is generated, an intermediate reaction zone in which the liquor is thermally reconstituted, and a downstream cooling and evaporating zone in which heat is transferred from the hot gases to the incoming liquor to concentrate the liquor by evaporation and to cool the gases.

The invention is further described, by way of example, with reference to the accompanying drawings, in which:

FIG. 4 shows a modified version of the plant of FIG. 3.

Figure 1:
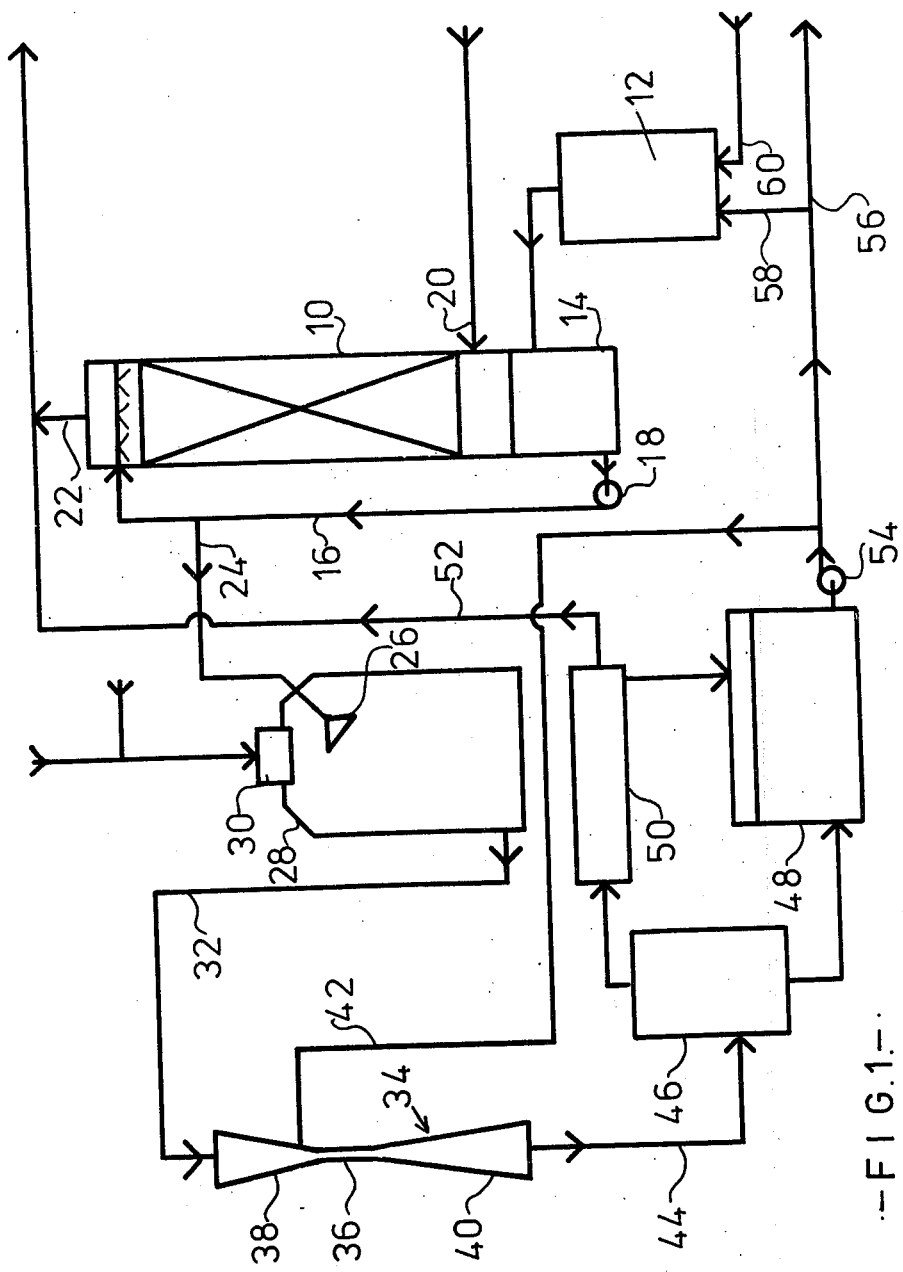
FIG. 1 is a diagrammatic representation of a plant which operates in accordance with a first embodiment of the invention, shown in combination with a cyanide washing plant.

The cyanide washing plant shown in FIG. 1 comprises a scrubbing tower 10 and a sodium polysulphide generator 12. At the base of the tower 10 is a wash liquor tank 14 from which liquor is transferred through a line 16 by a pump 18 to the top of the tower, the wash liquor then permeating down through the tower to return to the tank 14. Sodium polysulphide from the generator 12 is mixed with the liquor in the tank 14 and reacts, in the tower 10, with hydrogen cyanide contained in the gas entering the tower at 20 to form sodium thiocyanate. Washed gas passes out of the tower through a line 22.

To control thiocyanate concentration in the liquor, it is necessary to bleed off contaminated liquor by way of a line 24 and to introduce fresh liquor by way of the polysulphide generator 12. Hitherto, contaminated liquor removed through the line 24 has been treated as a waste product. Disposal of the waste product has caused problems especially as it contains sodium thiocyanate which is biologically objectionable. Whilst thiocyanate is bio-degradable in the presence of certain organisms at concentrations in the order of 1000 ppm, dumping of contaminated liquor would involve a very heavy dilution water requirement and also, of course, result in loss of reagents. Alternatively, the contaminated liquor may be treated, by for example oxidative combustion, before dumping.

In the plant illustrated in FIG. 1, the contaminated liquor removed through the line 24 is introduced by way of a spraying device 26 into a combustion chamber 28 in which the liquor is reconstituted at high temperature under a reducing atmosphere. The temperature in the combustion chamber 28 is preferably maintained by means of a burner 30 supplied with closely controlled quantities of fuel, gas and air. The ratio of gas to air introduced into the combustion chamber is typically such as to produce an atmosphere in the chamber comprising 1 to 4 volume percent carbon monoxide, 2 to 10 volume percent hydrogen and a balance of water vapour, carbon dioxide, nitrogen and hydrocarbons. The spraying device 26 through which the contaminated liquor is introduced into this reducing atmosphere is preferably formed of steam atomisation sprays to ensure the formation of fine droplets of liquor whilst avoiding the introduction of air into the chamber. As is clear from FIG. 1, the spraying device 26 enters the chamber 28 appreciably downstream of the burner 30 so that the hot reducing atmosphere is generated in the absence of the contaminated liquor and the contaminated liquor is subsequently sprayed into the hot reducing atmosphere for thermal reconstitution. Combustion of the liquor in the chamber 28 liberates the majority of the sulphur in the thiocyanate as hydrogen sulphide which is conducted, together with such other gaseous materials as may be present and finely divided particulate matter containing sodium compounds, through a line 32 to a venturi scrubber 34 in which vapours are condensed and the particulate matter is taken into aqueous solution to form reconstituted alkali wash liquor in fine droplet form. The venturi scrubber 34 comprises a narrow throat 36 and frusto-conical lead-in and lead-out portions 38 and 40. Liquor is introduced by way of a line 42 through a spray (not shown) situated within the venturi scrubber 34 upstream of the narrow throat 36.

Dissolved particulate matter, condensed vapours, uncondensed vapours and gases pass from the venturi scrubber 34 by way of a line 44 to a cyclone separator 46 in which the liquid and gaseous materials are separated. Liquid, which will basically be sodium carbonate solution, collects in a tank 48 and the gaseous materials pass through a condenser 50, condensed liquid from the condenser 50 being passed to the tank 48 and uncondensed gases, which are rich in hydrogen sulphide, being conducted away through a line 52 which joins the gas outlet line 22 from the tower 10.

A pump 54 conducts liquor from the tank 48 through an outlet line 56 from which branch the line 42 to the venturi scrubber 34 and a line 58. The line 58 supplies liquor to the polysulphide generator 12 which is also supplied through a line 60 with elemental sulphur slurried with alkali liquor. The amount of liquor entering the polysulphide generator 12 with the sulphur slurry is substantially equal, at least in terms of dissolved alkali, to the amount of liquor passing from the plant through the line 56.

If it were desired merely to remove hydrogen cyanide from the gas under treatment to produce gas having a greater hydrogen sulphide content than it may have had initially, the plant illustrated in FIG. 1 could be made complete and self-contained by slurrying elemental sulphur with the wash liquor issuing from the line 56 and supplying the sulphur slurry to the polysulphide generator through the line 60. The added sulphur would then be consumed and would escape as hydrogen sulphide through the line 22. However, the plant shown in FIG. 1 is particularly suitable for use with a hydrogen sulphide washing plant in which elemental sulphur is recovered from the gas under treatment. In such a plant, gas from the line 22 is washed in an aqueous alkali wash liquor and the resulting hydrosulphide is oxidised to elemental sulphur which is removed from the wash liquor by froth flotation. The hydrosulphide is oxidised to sulphur by pentavalent vanadium which is complexed with citrate and which during oxidation of the hydrosulphide is itself reduced to quadrivalent vanadium. The reduced vanadium is reoxidised to pentavalent vanadium by aerial oxygen in the presence of anthraquinone disulphonate. The net result is the oxidation of hydrogen sulphide to elemental sulphur by aerial oxygen. When the gas entering the cyanide scrubbing tower at 20 already contains hydrogen sulphide, only a portion of the recovered sulphur need be slurried with wash liquor and returned to the polysulphide generator 12.

Whilst the invention has been described in connection with a cyanide washing plant, it is also applicable, inter alia, to a hydrogen sulphide washing plant of the type described above. During aerial oxidation of quadrivalent vanadium to pentavalent vanadium, any hydrosulphide remaining in solution will be liable to oxidise to thiosulphate and some sulphur in suspension will also oxidise to thiosulphate. The anthraquinone will also oxidise thiosulphate to sulphate. Therefore, as in the above described cyanide washing plant, the alkali wash liquor must be discarded and replaced, disposal of the discarded liquor resulting in loss of alkali and sulphur. The illustrated plant, with the omission of the parts 10 to 22 and 58 and 60 may be used to reconstitute effluent wash liquor contaminated with thiosulphate, sulphate and, if the incoming gas contains cyanide, thiocyanate. Wash liquor is bled off through the line 24 and reconstituted alkali liquor is returned through the line 56.

Figure 2:
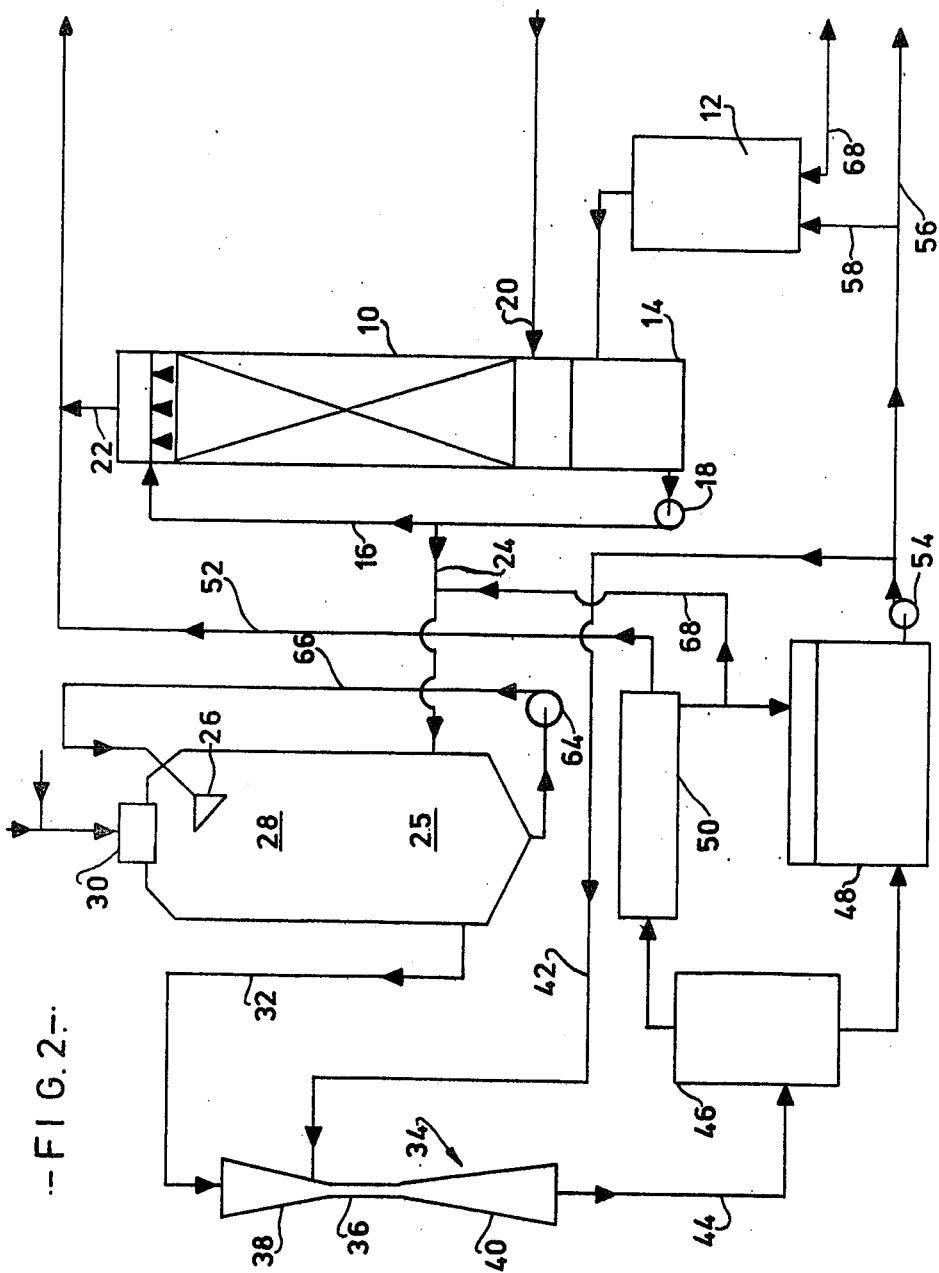
FIG. 2 is a diagrammatic representation of a plant which operates in accordance with a second embodiment of the invention, also shown in combination with a cyanide washing plant.

The embodiment of FIG. 2 is similar to that shown in FIG. 1 and like reference numerals have been used to denote like parts. FIG. 2 differs from FIG. 1 in including an evaporator 25 through which the contaminated liquor is passed before thermal reconstitution.

The evaporator 25 serves to concentrate and preheat the contaminated liquor drawn off through the line 24, concentrated liquor passing from the evaporator by way of a pump 64 and line 66 to the spraying device 26, and water vapour being conducted from the evaporator through the line 32. A proportion of the water in the liquor drawn off through the line 24 therefore by-passes the combustion chamber 28, that is, passes directly from the line 24 to the line 32 without being sprayed into the combustion chamber by the device 26. This by-passing of water past the combustion chamber permits a very significant reduction in size of several of the plant items and a reduction in the amount of fuel required to combust the liquor. Reduced fuel consumption results in a reduction in the amount of water vapour introduced into the system by the burner 30 so that the amount of water which needs to be evaporated at a later stage to maintain a water balance across the desulphurisation plant is also reduced.

In FIG. 2, the combustion chamber 28 and evaporator 25 are combined into one vessel for direct heat transfer from the products of combustion to the liquor to be concentrated. The liquor is thereby concentrated and preheated and the products of combustion are cooled and mixed with water vapour from the liquor. The venturi scrubber 34 can thus be a low temperature device which may readily be designed to include an adjustable throat.

As the liquor is very corrosive, a conventional tubed evaporator is not appropriate, the evaporator 25 preferably being being a direct contact heat exchanger in the form of a spray tower which is so designed that water is evaporated from the liquor by the hot products of combustion, but regenerated solids in the products of combustion are not removed by the liquor. However, the liquor may advantageously remove from the vessel 25, 28 such heavy solids as may be formed in the combustion chamber.

It is found that the heat content in the products of combustion may be such that the liquor is overconcentrated in the evaporator and becomes too viscous to be sprayed by the device 26. There is accordingly shown in FIG. 2 a line 68 through which a proportion of the condensate from the condenser 50 may be mixed with the liquor in the line 24.

Figure 3:
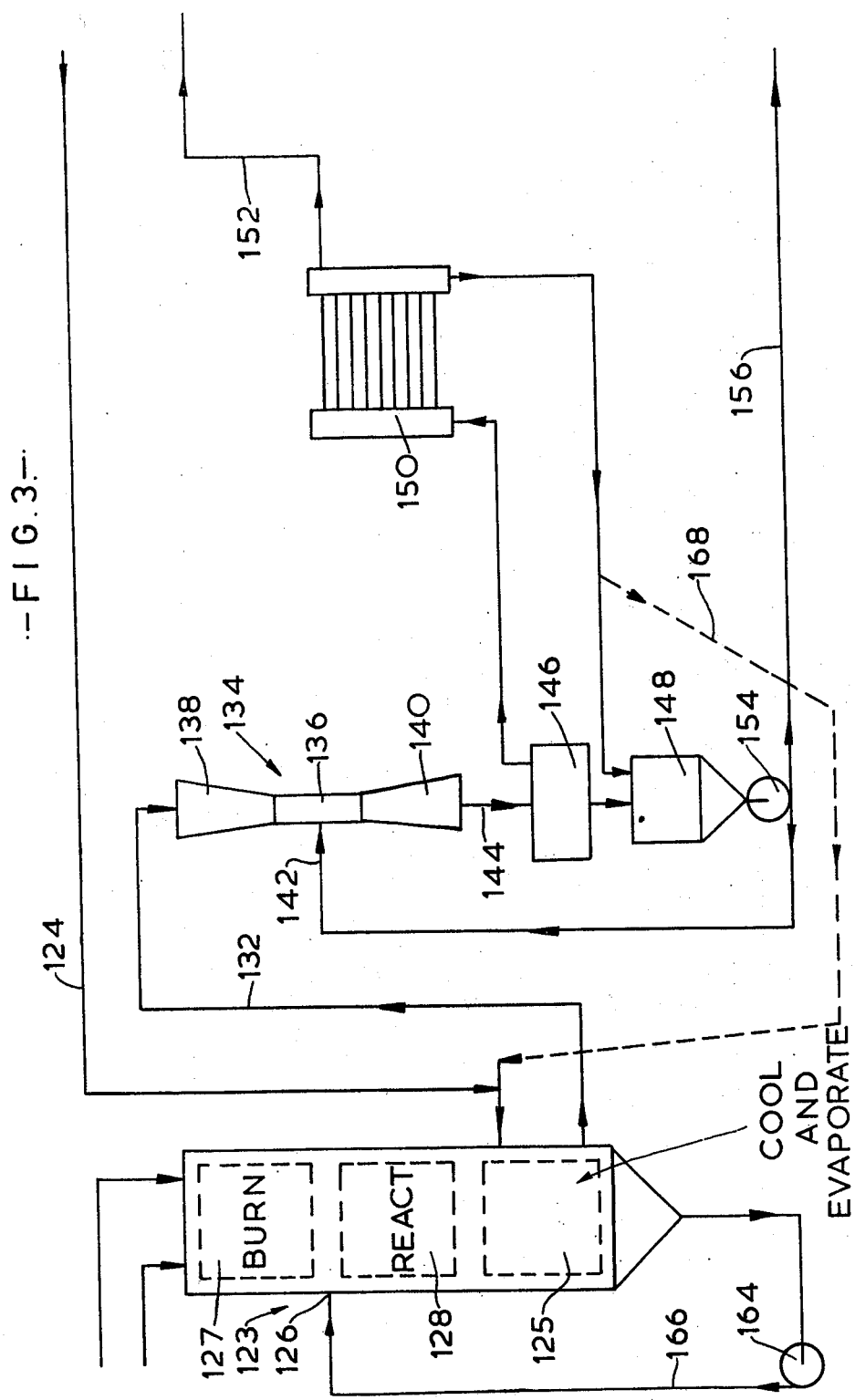
FIG. 3 is a diagrammatic representation of a plant which operates in accordance with a third embodiment of the invention, showing three distinct zones in a heat treatment chamber.

Referring to FIG. 3, a heat treatment vessel 123 encloses a chamber having three separate zones, namely an upstream combustion zone 127 in which an excess of fuel gas is burned in air to generate a hot reducing atmosphere; an intermediate reaction zone 128 into which the hot reducing atmosphere passes to thermally reconstitute concentrated liquor which is introduced at 126, downstream of the combustion zone 127; and a downstream evaporator zone 125 in which liquor is concentrated by evaporation.

Contaminated liquor for reconstitution is introduced by way of the line 124 into the evaporator zone 125, is concentrated by direct contact with hot gases in the vessel 123 and is passed by a pump 164 through a line 166 into the reaction zone 128 at the point 126. Reaction products which have been cooled by heat transfer to incoming liquor in the evaporator 125 are conducted through a line 132 to a venturi scrubber 134 in which vapours are condensed and particulate matter is taken into aqueous solution to form reconstituted alkali wash liquor. The venturi scrubber 134 comprises a narrow throat 136 and frusto-conical lead-in and lead-out portions 138 and 140. Liquor is introduced by way of a line 142 through a spray (not shown) situated within the venturi scrubber 134.

Dissolved particulate matter, condensed vapours, uncondensed vapours and gases pass from the venturi scrubber 134 by way of a line 144 to a cyclone separator 146 in which the liquid and gaseous materials are separated. Liquid, which will basically be sodium carbonate solution, collects in a tank 148 and the gaseous materials pass through a condenser 150, condensed liquid from the condenser being passed to the tank 148 and uncondensed gases, which are rich in hydrogen sulphide, being conducted away through a line 152.

A pump 154 conducts liquor from the tank 148 through an outlet line 156 and through the line 142 to the venturi scrubber 134.

The heat content in the reaction products may be such that the liquor is overconcentrated in the evaporator zone 125 and becomes too viscous to be sprayed into the reaction zone 128. There is accordingly shown a by-pass line 168 through which a proportion of the condensate from the condenser 150 may be mixed with the liquor in the line 124.

FIG. 4 shows a modified system in which a vessel 223 defines a lateral chamber constituting a combustion zone 227 in which a hot reducing atmosphere is generated. Concentrated liquor passed through a line 266 by a pump 264 from a lower evaporator zone 225 is introduced through a spray 226 disposed vertically above a reaction zone 228. Contaminated liquor for concentration enters along a line 224 and passes into the evaporator zone 225 through a spray 229. Reaction products pass directly into a venturi scrubber 234 and then to a cyclone separator 246. Reconstituted liquor from the cyclone separator 246 is passed by a pump 254 along a line 255 which joins an outlet line 256 and a line 242 which supplies a proportion of the liquor to the venturi scrubber 234. Vapours from the cyclone separator 246 pass to a condenser 250 from which gaseous materials are conducted away along a line 252 and from which condensate is conducted directly to the input side of the pump 254. A branch line 259 is used to introduce a proportion of the condensate into the evaporator zone 225 by way of a spray 261 to control the consistency of the concentrated liquor which is introduced into the reaction zone 228.

In the embodiments of FIGS. 2, 3 and 4, the contaminated liquor is concentrated by spraying the liquor in coarse droplet form into incineration gases issuing from the reaction zone where previously concentrated liquor is undergoing thermal reconstitution. The coarse liquid droplets present a sufficient surface area to give rise to efficient evaporation from the surface but the droplets are too coarse to collect any appreciable amount of finely divided solid product existing in the incineration gas. This enables the incineration gas to be cooled but to retain its solids content until it passes from the evaporator into the venturi scrubber or other suitable dust collection device. The liquor thus concentrated is collected from the base of the evaporator zone and recycled to the high-temperature reaction zone where it is very finely atomised so that solid products of incineration exist as a fine fume which is able to pass through the evaporator zone without being collected by the coarse droplets undergoing concentration.

Evaporation by direct contact between coarse droplets and hot gases avoids difficulties which are encountered with other evaporation techniques. Indirect heat exchangers such as shell and tube or plate-to-plate evaporators are expensive, difficult to clean and prone to problems of deposition and corrosion. Another prior art technique is to hold the liquor in bulk in a tank and bubble hot incineration gases through the bulk liquor. In this technique, it is difficult to achieve stable gas pressure and there are problems arising from foaming. Also, it is impossible to avoid collecting substantial quantities of solids in the bulk liquor.

EXAMPLE

The incineration of a liquor containing 200 gramme per liter sodium thiocyanate was achieved by subjecting the liquor to a reducing atmosphere at an elevated temperature over 600° C. If this liquor had been injected directly into the high temperature section of the incinerator, the ancillary fuel requirement would have been in the order of 3000 Btu/lb of effluent feed. However, by concentrating the raw effluent, the nett auxillary fuel requirement was reduced to below 2000 Btu/lb. Concentration was achieved by spraying the raw feed into the evaporator section of the incincerator so as to produce droplets substantially above 1000 micron diameter. The partially evaporated liquor was collected in the base of the incinerator at a solids concentration of up to 450 gramme per liter and was then recycled to the incinerator high temperature sprays where stream atomisation produced droplets below 100 micron, mainly around 10 micron. Reduction of this liquor by the high temperature gases led to the production of a sub-micron fume which was able to pass right through the pre-concentrate sprays, even though its carrier gas was cooled to 120° C. The cooled product was then passed to a high pressure venturi scrubber where the solid sodium carbonate product was collected in solution. In a second trial, aqueous liquor containing sodium thiosulphate was subjected to oxidative incineration at an elevated temperature of about 700° C to produce sodium carbonate and sulphur dioxide. The moist acidic gas thus produced is highly corrosive and would damage heat exchange surfaces in conventional indirect heat exchangers and give rise to solids deposition. To avoid these problems, concentration of raw liquor was effected by passing the incineration gases through a coarse spray of raw liquor, using droplets in the order of 1000 micron and a residence time of about one second. The concentration of solute in the liquor was thereby raised from 150 to 300 grammes per liter and the incineration gases were cooled to about 80° C. It was found that the coarse droplets had collected only about 15% of the sodium carbonate and very little of the sulphur dioxide.

The embodiments of the invention in which an exclusive property or privilege is claimed are defined as follows:

1. A process for incinerating aqueous liquor containing alkali or metal salts which is pre-concentrated by heat exchange from incineration gases, comprising atomising said liquor into droplet form, bringing said liquor in droplet form into direct contact with hot incineration gases to effect partial evaporation of liquor from the surface of the droplets and cooling of said gases, and passing the partially evaporated liquor in the vapor and/or particulate phase to an incineration chamber for incineration of the partially evaporated liquor and the production of hot incineration gases containing substantially all the solid particulate product of the incineration for pre-concentration of subsequently atomised liquor.

2. A process as claimed in claim 1 in which said partially evaporated liquor is sprayed into said incineration chamber in such a manner as to produce a spray which is fine in relation to said droplets.

3. A process as claimed in claim 2 in which the fine spray is finer than said droplets by at least a factor of 10.

4. A process as claimed in claim 1 in which said incineration and said evaporation are performed in a common enclosure.

* * * * *